United States Patent [19]

Rehbein

[11] 4,264,097
[45] Apr. 28, 1981

[54] SUSPENSION CHAIN HEAD

[75] Inventor: Friedhelm Rehbein, Menden-Oesbergn, Fed. Rep. of Germany

[73] Assignee: Firma August Thiele, Iserlohn-Kalthof, Fed. Rep. of Germany

[21] Appl. No.: 917,393

[22] Filed: Jun. 20, 1978

[30] Foreign Application Priority Data

Jul. 16, 1977 [DE] Fed. Rep. of Germany ....... 2732246

[51] Int. Cl.³ .............................................. B66C 1/12
[52] U.S. Cl. ................................... 294/78 R; 59/93; 294/74
[58] Field of Search ..................... 294/74, 78 R, 78 A, 294/82 R; 24/116 R; 59/84-87, 90, 93

[56] References Cited

U.S. PATENT DOCUMENTS

| | | | |
|---|---|---|---|
| 1,689,170 | 10/1928 | Farmer | 294/78 R |
| 2,430,966 | 11/1947 | Taylor | 59/90 |
| 3,167,342 | 1/1965 | Broyles | 294/74 X |
| 3,795,951 | 3/1974 | Ratcliff | 59/93 X |
| 3,831,993 | 8/1974 | Drayton et al. | 294/78 R X |
| 4,068,467 | 1/1978 | Schreyer et al. | 294/78 R X |

FOREIGN PATENT DOCUMENTS

| | | | |
|---|---|---|---|
| 84283 | 9/1954 | Norway | 294/74 |
| 880296 | 10/1961 | United Kingdom | 59/85 |

Primary Examiner—Johnny D. Cherry
Attorney, Agent, or Firm—Michael J. Striker

[57] ABSTRACT

A suspension chain head for mechanically assembled strand-oriented sling chain systems has an annular suspension member, at least one forked member arranged for carrying a further member of the chain head and having a recess and a holding pin, and an intermediate member for connecting the forked member with the suspension member. The intermediate member has a first portion by which it is hung on the suspension member, and a second portion arranged to enter the recess of the forked member and provided with at least one hole arranged for receiving therein the holding pin of the forked member so as to connect the forked member to the intermediate member. The intermediate member may be provided with lateral spacing projections which have flattened, substantially spherically curved faces.

8 Claims, 6 Drawing Figures

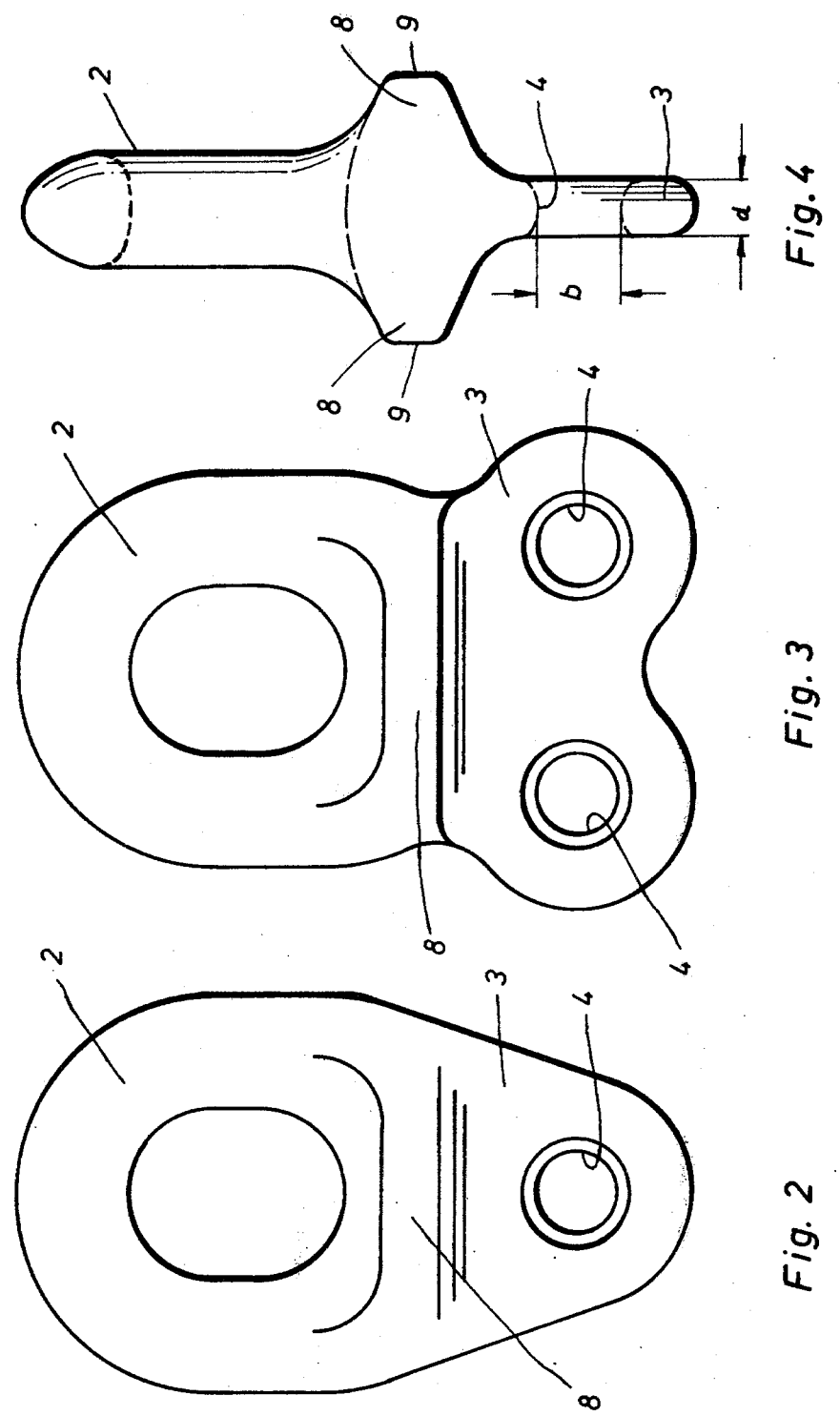

SUSPENSION CHAIN HEAD

BACKGROUND OF THE INVENTION

The present invention relates to a suspension chain head for a mechanically assembled strand-oriented sling chain system.

Suspension chain heads of the above-mentioned type have been known. Such a suspension chain head includes an annular suspension member which is welded to an annular transitional or intermediate member. The latter has a connecting element which is undetachably connected thereto and has dimensions and carrying capacity in a predetermined range. It serves for suspending or mounting loads, or for hanging, shortening and/or connecting the chains.

Customers frequently require strand-oriented suspension chain heads to be so formed as to exclude eventual faulty mounting of sling chains or connecting member to the elements of the chain head.

These requirements are met by the known suspension members for one strand or two strand sling chains, which are so formed for receiving a predetermined number of sling chains or connecting members so that the suspension element may be connected respectively with only one or more sling chains whose dimensions and carrying capacity are selected in a certain range. The known suspension members with the number of the chains connected thereto are increasingly expensive to manufacture and have inadequate strength.

Suspension chain heads have been also known including an annular suspension member which is welded to an annular or transitional intermediate member. A forked shackle or annular fork for connecting individual sling chains or connecting members of predetermined dimensions is welded to the transitional or intermediate member.

In such a suspension chain head the goal of mounting a predetermined limited number of sling chains is attained without the difficulties encountered in the use of the construction with three or more elements or sling chains. In this case, only such a sling chain or connecting member which has certain dimensions and carrying capacity can be mounted on each forked shackle or annular fork. However, since all members of such a suspension head up to the forked shackles or annular forks must be welded to one another, the chain head must be manufactured for different applications and loading conditions in an extraordinarily great number of different constructions and dimension, which particularly undesirably increase the storage expenditures.

SUMMARY OF THE INVENTION

Accordingly, it is an object of the present invention to provide a suspension chain head for mechanically assembled strand-oriented sling chain systems, which is composed of the smallest possible number of individual parts connected with one another and has a simple and sturdy construction. At the same time it provides for a possiblity to form a normal as well as a short structure.

In keeping with these objects, and with others which will become apparent hereinafter one feature of the present invention resides, briefly stated, in a suspension chain head for mechanically assembled strand-oriented sling chain system which has an annular suspension member and at least one forked member arranged for carrying a further member of the chain head and having a recess and a holding pin, wherein means for connecting the forked member with the suspension member is provided, which means includes an intermediate member having a first portion by which the intermediate member is hung on the suspension member, and a second portion arranged to enter the recess of the forked member and provided with at least one hole which is arranged for receiving therein the holding pin of the forked member so as to connect the forked member to the intermediate member. The second portion of the intermediate member is formed as a flange which is of one-piece with the remainder of the intermediate member.

The suspension chain head in accordance with the present invention has the advantage that the transitional or intermediate member together with its connecting flange may be integrally formed as a drop-forging part and heat-treated. Each transitional member has one or two holes which can be formed by drop forging. One or two transitional members are hung on the annular suspension member and can be thereafter welded to the latter. Such a simple manufacturing process can be performed after delivery, so that before this step only a small number of the individual parts need be maintained separate from one another and stored in such condition. This results in small storage expenditures with great delivery readiness. Moreover, the direct formation of the connecting flange in the transitional or intermediate member with the corresponding stepped dimensioning of the opening for the pins and the thickness of the connecting flange will guarantee that the finished suspension chain head can be connected only with connecting members of corresponding range.

The forked member may be formed as a double-forked connecting member, a slipping hanger, a shortening hanger and the like. The second portion or the connecting member of the intermediate member has a shape which is complementary to the shape of the recess in the forked member. The end portions of the forked member have a curved contour.

In accordance with another feature of the present invention, in order to reduce wear of the transitional or intermediate members in the regions of upper portions thereof which results from mutual friction in operation, each transitional or intermediate member may be provided with lateral spacing projections in an initial section of the connecting flange thereof. The lateral projections abut against one another so that the transitional or intermediate members are held at a distance from one another when they are hung on the suspension member.

In accordance with still another feature of the present invention the spacing projections have preferably flattened, substantially spherically curved abutting surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 2 and 3 are elevational views of a transitional or intermediate member with a connecting flange, in accordance with two different embodiments of the invention;

FIG. 4 is a side view of the members shown in FIGS. 2 and 3;

DESCRIPTION OF THE PREFERRED EMBODIMENTS

Figure 1:
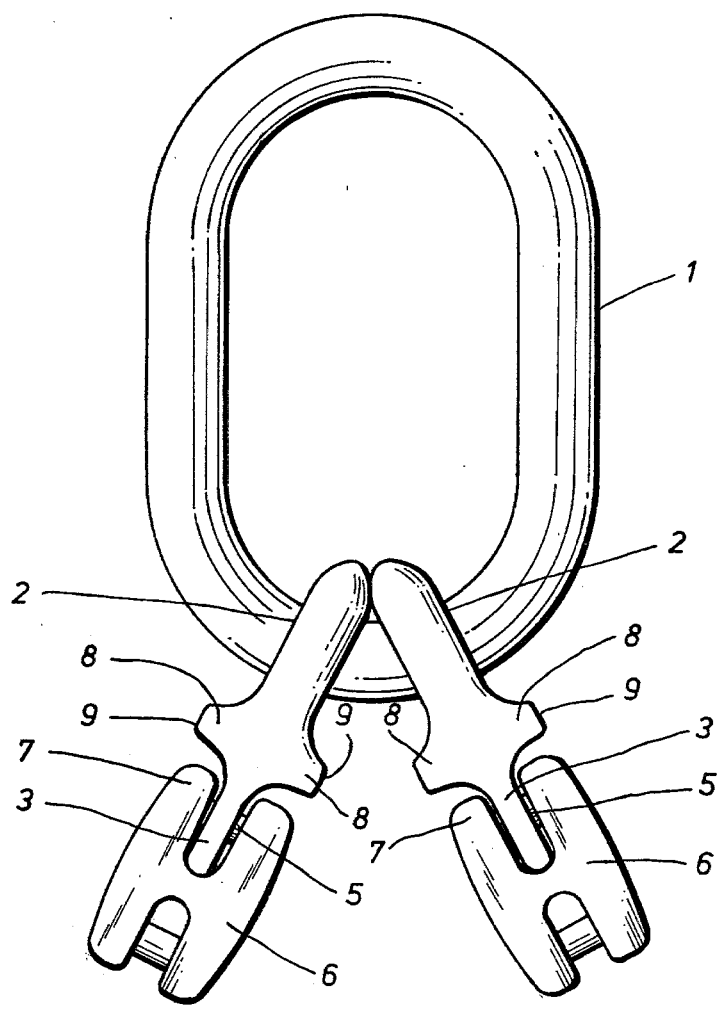
FIG. 1 is an elevational view of a suspension chain head for a two or more strand sling chain system.

FIG. 1 shows a suspension chain head for a mechanically assembled strand-oriented two or three strand sling chain system. The suspension chain head has an annular suspension member 1 and two annular transitional or intermediate members 2 which are welded to the suspension member 1. Each of the transitional or intermediate members 2 has two spaced ends of a curved contour. As can be seen from FIGS. 2 and 3, a connecting flange 3 is provided at one of these ends and formed of one piece with a remainder portion of the transitional or intermediate member 2. The connecting flange 3 may be provided with one hole 4 as shown in FIG. 2, or with two holes 4 as shown in FIG. 3. Connecting elements 6 are shown in FIG. 1 and each has a connecting fork 7 and a holding pin 5. The holding pin 5 of the respective connecting element 6 is inserted into the corresponding hole 4 of a transitional or intermediate member 2. The transitional or intermediate member 2 can be formed as a double-forked connecting member in accordance with the requirements made thereto, as shown in FIG. 1. This member may be also formed as a sliding hanger, as a shortening hanger or may be manufactured in any other form. In any case, it must be provided with the forked portion 7 corresponding to the required load range of the suspension chain head.

The connecting flange 3 of the transitional or intermediate member shown in FIG. 2 has a shape which decreases downwardly in wedge-like manner. The hole 4 is located substantially in a central region of this connecting flange. The connecting flange 3 of the transitional or intermediate member 2 shown in FIG. 3 is formed as a double flange with outer rounded surfaces. Two holes 4 are located at opposite sides of the upright plane of symmetry of the transitional or intermediate member 2 and at equal distance from this plane.

As can be seen from FIG. 4, the upwardly extending connecting flange 3 has practically equal thickness "d" in the direction of the hole 4. The diameter "b" of the hole 4 corresponds to the round steel chains or sling chains in accordance with the relevant load range.

Each transitional or intermediate member is formed as a drop-forged part and has, in an initial section of the connecting flange 3, two lateral spacing projections 8. The projections 8 are located opposite to and are mirror-symmetrical relative to one another. The lateral projections 8 have flattened abutting faces 9, which can be somewhat spherically curved.

Figure 5:
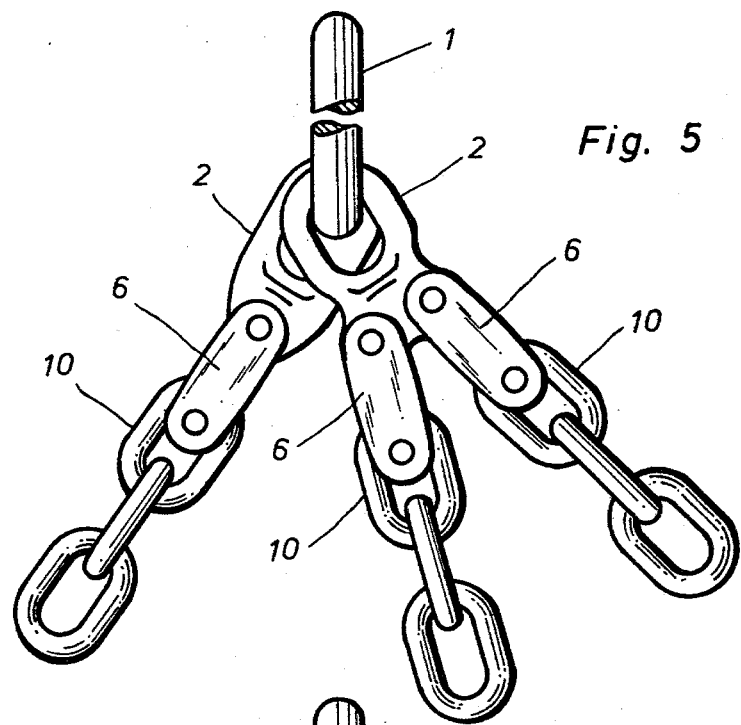
FIG. 5 is a view showing a three strand sling chain system which utilizes the transitional members in accordance with the present invention.

FIG. 5 shows a suspension chain head for a three strand sling chain system. It has one suspension member 1 and two transitional or intermediate members 2 which are connected with the suspension member 1. One of the transitional or intermediate members 2 is formed in accordance with the embodiment shown in FIG. 2, that is it has only one hole 4. Another transitional or intermediate member 2 is formed in accordance with the embodiment shown in FIG. 3, that is it has two holes 4. A double-forked connecting element 6 is hung to each hole 4 of the corresponding transitional or intermediate member 2, and is connected with a chain strand 10.

Figure 6:
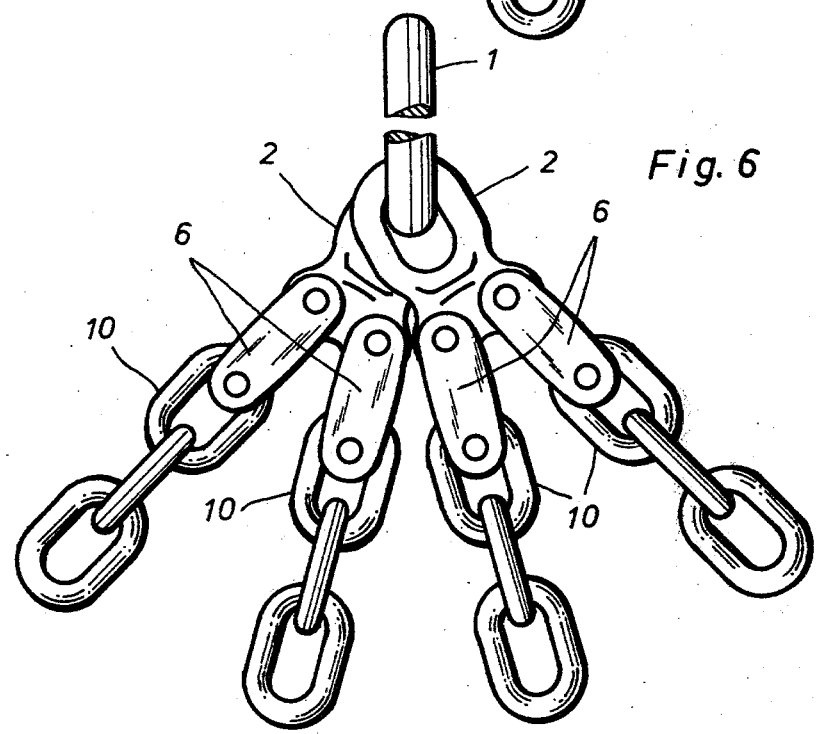
FIG. 6 is a view showing a four strand sling chain system utilizing the transitional members in accordance with the present invention.

FIG. 6 shows a suspension chain head for a four strand chain sling system. The suspension element 1 carries two transitional or intermediate members 2 which are formed in accordance with the embodiment shown in FIG. 3. The double-forked connecting elements 6 are hung on each of the intermediate or transitional members 2 and are connected with a chain strand 10.

It will be understood that each of the elements described above, or two or more together, may also find a useful application in other types of constructions, differing from the types described above.

While the invention has been illustrated and described as embodied in a suspension head chain, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A suspension chain head for mechanically assembled strand-oriented sling chain systems, comprising an annular suspension member; at least one forked member arranged for carrying a further member of the chain head and having a recess and a holding pin; and an intermediate member connecting said forked member with said suspension member, said intermediate member including a first end portion which is ring-shaped and circumferentially closed and which hangs on and is undetachably connected with said suspension member, said intermediate member also including a second end portion which forms a one-piece extension of said first end portion and is formed as a flat connecting flange, said second end portion being arranged to enter said recess of said forked member and provided with at least one hole arranged for receiving therein said holding pin of said forked member so as to connect said forked member to said intermediate member, said intermediate member further including a section provided with lateral spacing projections located between said first end portion hanging on said suspension member and said hole of said second portion receiving said forked member.

2. A chain head as defined in claim 1, wherein said second end portion of said intermediate member has a shape which is substantially complementary to a shape of said recess of said forked member.

3. A chain head as defined in claim 1, wherein said end portions of said intermediate member have a curved contour.

4. A chain head as defined in claim 1, wherein said end portions of said intermediate member are spaced from one another in a first direction, said projections extending in a second direction which is transverse to said first direction.

5. A chain head as defined in claim 1, wherein said projections are located opposite and are mirror-symmetrical relative to one another.

6. A chain head as defined in claim 1, wherein each of said projections has a flattened face.

7. A chain head as defined in claim 6, wherein said faces have curved sections.

8. A chain head as defined in claim 1 wherein said forked member is a double-forked connecting member.

* * * * *